United States Patent [19]

Ball et al.

[11] Patent Number: 4,896,032

[45] Date of Patent: Jan. 23, 1990

[54] ACTIVE BORESIGHT DRIFT MEASUREMENT AND CALIBRATION APPARATUS

[75] Inventors: James M. Ball, Huntington Beach; Issac Richman, Newport Beach, both of Calif.

[73] Assignee: The United States of America as represented by the Secretary of the Air Force, Washington, D.C.

[21] Appl. No.: 303,418

[22] Filed: Jan. 26, 1989

[51] Int. Cl.$^4$ .................. H05H 3/00; G01B 11/27
[52] U.S. Cl. .................. 250/251; 250/397; 250/491.1; 356/150; 356/152; 356/153
[58] Field of Search .............. 250/251, 397, 491.1; 356/150, 152, 153

[56] References Cited

U.S. PATENT DOCUMENTS

| | | | |
|---|---|---|---|
| 3,782,826 | 1/1974 | Offutt | 356/110 |
| 3,926,523 | 12/1975 | Chapman | 356/110 |
| 4,168,908 | 9/1979 | Cubalchini | 356/152 |
| 4,227,807 | 10/1980 | Pond et al. | 356/152 |
| 4,627,722 | 12/1986 | Falk et al. | 356/4.5 |
| 4,700,068 | 10/1987 | McClung et al. | 250/251 |
| 4,714,339 | 12/1987 | Lau et al. | 356/4.5 |

OTHER PUBLICATIONS

Jenkins and H. E. White, "Fundamentals of Optics", 2nd Edition, McGraw Hill Book Co., 1950, pp. 240–244.

Primary Examiner—Jack I. Berman
Attorney, Agent, or Firm—William Stepanishen; Donald J. Singer

[57] ABSTRACT

An active boresight drift measurement and calibration apparatus utilizing a predetermined number of interferometer units to measure the distances between themselves, the target tracking unit and the beam direction sensing unit. The interferometer units provide the initial alignment reference and by periodic repeat measurements provides distance change data to establish boresight alignment drift correction angles.

8 Claims, 2 Drawing Sheets

ACTIVE BORESIGHT DRIFT MEASUREMENT AND CALIBRATION APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates boardly to a boresight alignment apparatus, and in particular to an active boresight drift measurement and calibration apparatus.

The state of the art of boresight alignment apparatus is well represented and alleviated to some degree by the prior art apparatus and approaches which are contained in the following U.S. Patents:

U.S. Pat. No. 3,782,826 issued to Offutt on Jan. 1, 1974;

U.S. Pat. No. 3,926,523 issued to Chapman on Dec. 16, 1975;

U.S. Pat. No. 4,168,908 issued to Cubalchini on Sept. 25, 1979;

U.S. Pat. No. 4,227,807 issued to Pond et al on Oct. 14, 1980; 15 U.S. Pat. No. 4,627,722 issued to Falk et al on Dec. 9, 1986; and U.S. Pat. No. 4,714,339 issued to Lau et al on Dec. 22, 1987.

Cubalchini discloses a pointing and tracking control system which adjusts the relationship between a source for producing an electromagnetic beam and a target. The patented device includes a retroreflector and a high efficiency diffraction grating.

Chapman discloses an optical system for angle measurement comprising four retroreflectors arranged in pairs. A laser beam is passed from the retroreflectors through a beam splitter to an interferometer. The angular displacement of the moveable retroreflectors is deduced from the distance between their ridges and the number of fringes generated at the beam splitter.

Pond et al discloses the interference effect of a pair of parallel beam changes in accordance with path length and object angle. The interference effect is summed at a detector, and then analyzed by a tracking circuit to determine object angle.

Offutt discloses an interferometer to measure changes in path length of an optical system due to changes in the angle of rotation of a rotatable device.

Folk et al discloses using interference fringes to obtain the three-dimensional coordinates of one or more distant point light sources.

Lau et al discloses a laser tracking system which senses the angular orientation of a target.

This design allows the accurate pointing of neutral beams over long ranges. The dominant error source for long range pointing is the boresight alignment drift between the beam direction sensor and the target tracker. A previous approach pointing is the boresight alignment drift between the beam direction sensor and the target tracker. A previous approach was to maintain thermal control of the structure connecting the two sensor boresights.

As target range increases beyond several hundred kilometers, structural thermal control alone becomes inadequate. This design reduces the need for increased thermal control for longer target ranges. Instead, boresight alignment drift is measured and then used for beam pointing compensation.

The active boresight drift alignment measurement and calibration apparatus may be utilized in applications in which various types of directed energy devices that require high pointing accuracy are needed. The apparatus uses separate light paths to spatially locate the relative position of each sensor element defining its boresight. As these lengths change by very small amounts, the resulting angular shift in boresights is geometrically computed.

SUMMARY OF THE INVENTION

The present invention utilizes a two wavelength pointing system for the alignment of the boresight of a long range target tracker. Boresight alignment drift is measured and then used for beam pointing compensation. A change in alignment produces a change in the path length of two different optical wavelength interferometers. This results in a change in interference fringe spacing which is compensated by the movement of an optical wedge in one leg of the interferometers. The amount of wedge movement is an indication of the amount of boresight misalignment and may be used to correct the pointing error.

It is one object of the present invention, therefore, to provide an improved active boresight drift measurement and calibration apparatus according to the present invention.

It is another object of the invention to provide an improved active boresight drift measurement and calibration apparatus which utilizes interferometers to determine boresight alignment drift angles.

It is yet another object of the invention to provide an improved active boresight drift measurement and calibration apparatus which directly measures only distances, not angles, to boresight sensors.

It is still another object of the invention to provide an improved active boresight drift measurement and calibration apparatus which utilizes interferometer reflectors on the sensor hardware, i.e, the tracker optics and the beam direction sensor wire ends.

It is still another object of the invention to provide an improved active boresight drift measurement and calibration apparatus which is economical to produce and utilizes conventional, currently available components that lend themselves to standard mass production manufacturing techniques.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
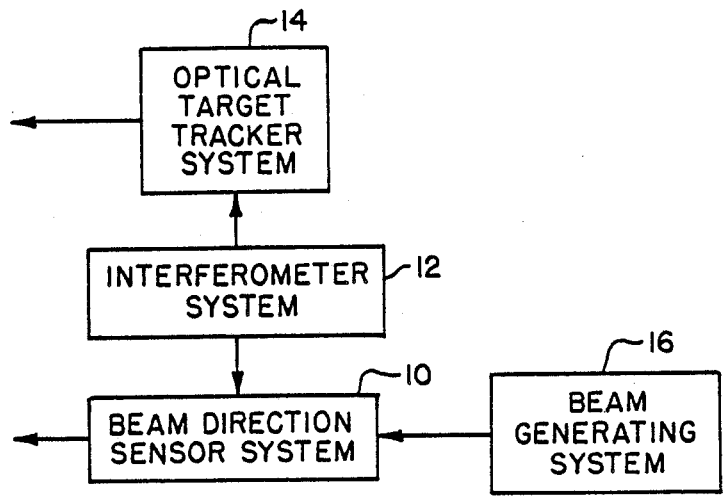
FIG. 1 is a simplified block diagram of the active boresight drift measurement and calibration apparatus according to the present invention.

Referring now to FIG. 1, there is shown a simplified block diagram of the active boresight drift measurement and calibration apparatus. In a neutral particle beam or other such beam generating system, a tracking and pointing system is necessary to maintain accurate pointing of the neutral beam over long ranges. A beam generating system 16 is utilized to generate a beam such as a neutral particle beam to irradiate a target. The generated beam is applied through beam direction sensor system 10 to the target of interest. The dominant error source in the range pointing system is the boresight drift alignment between the beam direction sensor system 10 and the target tracker system 14. The target tracker system 14 typically employs an optical target tracker. There is a variety of commercially-available optical target trackers which may be utilized in the present invention. In order to maintain accurate pointing angles, in this example, for a neutral particle beam, the alignment between the optical target tracker system must be determined and maintained or corrected. The interferometer system 12 is utilized to determine the boresight alignment drift between the beam direction sensor system 10 and the optical target tracker system 14.

Figure 2:
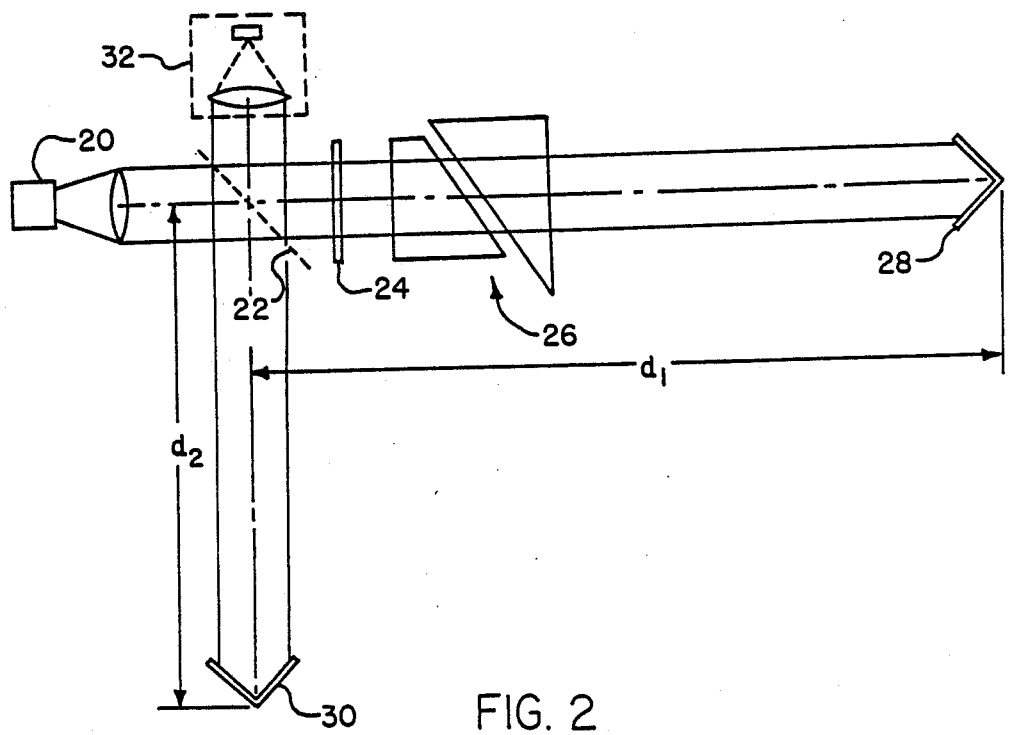
FIG. 2 is a schematic diagram of the interferometer distance measurement apparatus.

Turning now to FIG. 2, there is shown a schematic diagram of the interferometer distance measurement apparatus. The interferometer apparatus utilizes an extended light source 20 which provides two emission lines. The light from the extended light source 20 is split by partially reflecting mirror 22 into two paths. In the first path, light passes directly through mirror 22 to the measurement end reflector 28. In the first path, there is positioned a dither assembly 24 and a movable optical wedge 26. In the second path, light is reflected by the mirror 22 to the reference end reflector 30. Light from both reflectors 28, 30 are reflected respectively to the image detecting assembly 32. The first and second paths respectively have path lengths $d_1$ and $d_2$. The first path, $d_1$ is the measured path and the second path, $d_2$ is the reference path.

The interferometerr distance measurement apparatus is operated in the following manner. The interferometer apparatus measures the change in one path length relative to another. The length of the first and second paths is $d_2$, as shown in FIG. 2. The extended light source 20 emits two lines with a wavelength separation of $\Delta\lambda$, and average wavelength $\lambda_o$. Thus, the two emissions lines $\lambda_1$, $\lambda_2$ may be defined as follows: $\lambda_1 = \lambda_o + \Delta\lambda/2$, and $\lambda_2 = \lambda_0 - \Delta\lambda/2$. Each of these emission lines produces, at the imaging detecting assembly, a concentric ring pattern whose spacing depends on imaging lens focal length, wavelength, and the optical path difference between $d_1$ and $d_2$. Each ring of the pattern is labeled by an order (cf. F. A. Jenkins and H. E. White, *Fundamentals of Optics*, 2nd Edition, McGraw Hill Book Co., 1950, pages 240-244.). The optical wedge assembly 26 which is included in the optical path $d_1$, provides control of the optical path length in $d_1$. The dither assembly 24 which is also in optical path $d_1$, consists of a (thin) transparent plate which can be inserted into optical path $d_1$ at will. For some pair of orders (say $m_1$, for $\lambda_1$, and $m_2$ for $\lambda_2$), a ring of one wavelength will be in near coincidence with that of the other wavelength. For some other pair of orders there will be a near anticoincidence, i.e., a ring of one wavelength will lie very close to midway between two rings of the other wavelength. The following refers to coincidence, but a similar presentation holds for the anticoincidence cases.

When the overall system calibration is established, let a fringe pair be in very near coincidence. As changes in the difference of the optical path ($d_1 - d_2 = d$) occur, the fringes will move slightly out of coincidence. The dither plate 24 is inserted and it is noted whether the fringes move back toward coincidence or further from coincidence. This establishes the sign of d (optical path length difference). Dithering may be done in a periodic fashion for nearly continuous updates. From the knowledge of the sign of d, the optical wedge 26 is moved to bring the same fringe pair back into coincidence.

There is a one-to-one relation between the wedge motion and optical path length change; thus, a knowledge of the wedge position relative to its position at system calibration yields the change in path length difference. The change in system alignment may then be computed from the complete set of changes in path length of all the interferometers.

Applying the formulae of Jenkins and White (ibid.), it may be shown that for $d = 0.01$ meter and $\lambda_o = 500$ nm, the angular spacing in fringes of one pattern is 160 $\mu$rad. This is a reasonable value for an imaging system; a one meter effective focal length implies 160 $\mu$m between fringes. Typical charge coupled device area arrays have pixel elements in the 10 $\mu$m to 25 $\mu$m range. The smaller pixels would permit maintenance of fringe coincidence to about one-tenth of a fringe spacing. One-tenth of a fringe spacing corresponds to a change in the path difference of one-twentieth of a wavelength. The use of a two-emission line source reduces the susceptibility of the measurement to vibration in the imaging and source sections.

Figure 3:
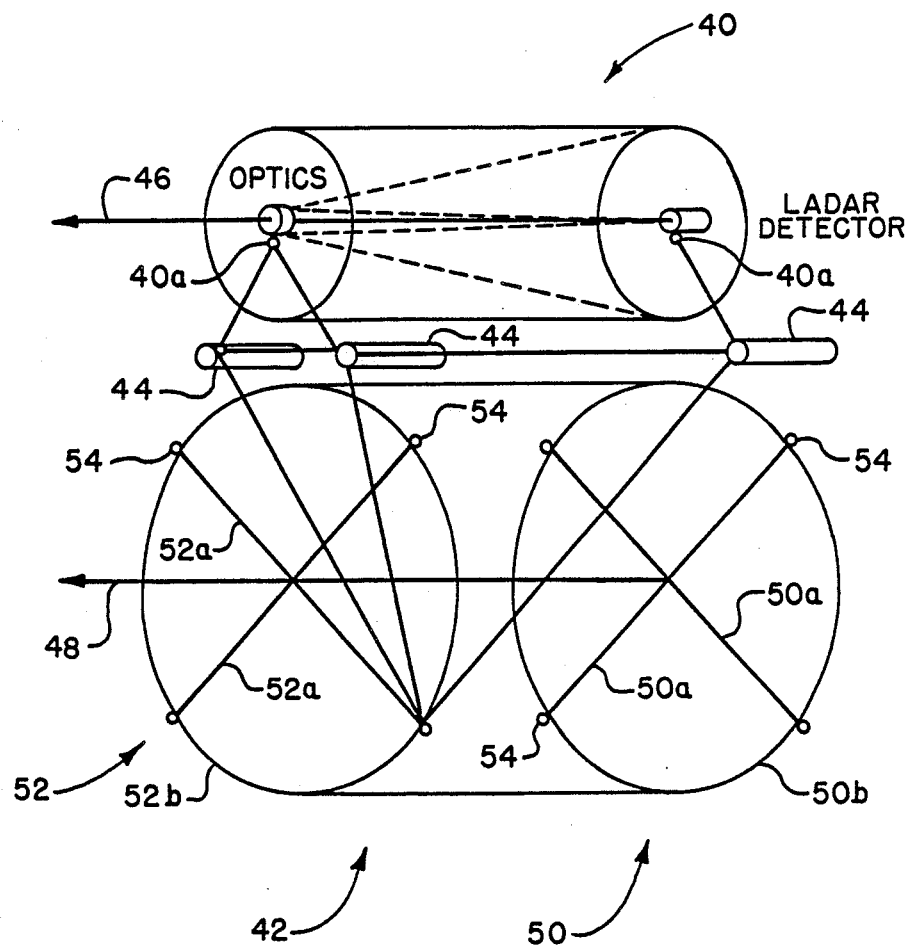
FIG. 3 is a plane view of a typical sensor alignment measurement system utilizing the active boresight drift measurement and calibration apparatus.

In FIG. 3, there is shown an active boresight drift measurement and calibration apparatus being utilized in the target tracking and beam direction sensing boresight system. In order to better illustrate how the interferometer apparatus (shown in FIG. 2) is utilized in the system (shown in FIG. 1, this example will show a ladar target tracker unit 40 (the optical tracker 14 of FIG. 1) and a shadow wire beam direction sensor unit 42 (beam direction sensor system 10 of FIG. 1). The interferometer system 12 of FIG. 1 comprises alignment interferometers 44. The ladar target tracker unit 40 is an optical target tracking means which has a ladar tracker boresight 46. The shadow wire beam direction sensor unit 42 is utilized to determine the beam direction boresight 48. The boresight alignment drift is the angle change between the ladar target tracker boresight and the beam direction boresight.

The beam direction sensor unit 42 comprises two sets of orthogonal wire pairs which are spaced a predetermined distance apart. One orthogonal wire pair comprises the beam direction sensor (BDS) shadow wires unit 50. The other orthogonal wire pair comprises the beam direction sensor (BDS) sense wires unit 52. The shadow and sense wires 50a, 52a are respectively operatively connected to cylindrical BDS housing 50b, 52b. Reflectors 54 which enhance the operation of the interferometers, are operatively connected to the shadow and sense wire 50a, 52a ends where they are respectively joined to the cylindrical BDS housing 50b, 52b.

Typically, the operation of the beam direction sensor unit 42 is as follows. A shadow which is due to the generated beam of the operative medium (for example, a neutral particle beam hitting the shadow wires 50a) is cast on the sense wires 52a. A current is generated in the sense wires 52a by the atoms of the generated beam. The current in the sense wire pairs 52a (each sense wire 52a comprises a closely spaced parallel set of wires) is affected by the position of the shadow which is caused by the shadow wires 50a. The direction and amount of misalignment is determined by the polarity and amplitude of the current in the sense wires 52a.

Since the cylindrical BDS housings 50b, 52b will expand due to effects of small thermal gradients, the wire end points of the BDS sense and shadow wires 50a, 52a will also move. As a result, the boresight alignment between the beam direction sensor and the target tracker will drift. This boresight alignment drift is measured and is used for beam pointing compensation. Each of the interferometer units 44 measure the distances, respectively, to the wire end points of the BDS shadow and sense wires 50a, 52a, between the interferometers 44 themselves, and to the ladar target tracker unit 40. Reflectors 40a on the ladar target tracker unit 40 and reflectors 54 on the beam direction sensor unit 42 wire end points are utilized to enhance the operation of the interferometer 44. In the present example, the interferometer optical path for only one wire end point and representative paths to the ladar target tracker unit 40, are shown for clarity. It should be well understood, that each interferometer unit 44 would measure the distance to each wire end point, the distance between each interferometer, and the distance to each reflector in the ladar target tracker unit 40. In addition, while only three interferometers 44 have been shown in the present illustrative example, it should be well understood that a greater number may also be used in the present apparatus. Once all the distances are measured, the boresight alignment drift correction angles may be computed from the change in the wire end point geometry. The wire end point locations are accurately measured by using the active boresight drift measurement and calibration apparatus which utilizes a device such as the Michelson interferometer.

Although the invention has been described with reference to a particular embodiment, it will be understood to those skilled in the art that the invention is capable of a variety of alternative embodiments within the spirit and scope of the appended claims.

What is claimed is:

1. An active boresight drift measurement and calibration apparatus comprising in combination:
    means for generating a beam,
    means for tracking a target, said target tracking means tracking a target and establishing a tracker boresight,
    means for sensing a beam direction, said beam direction sensing means operatively interacting with a generated beam and establishing a beam boresight for said generated beam, and,
    means for measuring distance, said distance measuring means operatively connected to said target tracking means and said beam direction sensing means, said distance measuring means making a predetermined number of distance measurements between said target tracking means and said beam direction sensing means, said distance measurements establishing the alignment of said tracker boresight with said beam boresight, an initial calibration state being established when the boresight alignment angle is substantially zero, said distance measuring means providing periodic distance measurements to establish changes in boresight alignment angle, said changes in boresight alignment angle are utilized as boresight alignment drift correction angles which may be utilized to correct the boresight differences between said target tracking means and said beam generating means.

2. An active boresight drift measurement and calibration apparatus as described in claim 1 wherein said target tracking means comprises an optical tracker.

3. An active boresight drift measurement and calibration apparatus as described in claim 1 wherein said beam sensing means comprises a shadow wire beam direction sensor.

4. An active boresight drift measurement and calibration apparatus as described in claim 1 wherein said beam generating means comprises a neutral particle beam generator.

5. An active boresight drift measurement and calibration apparatus as described in claim 1 wherein said distant measuring means comprises a predetermined number of interferometers.

6. An active boresight drift measurement and calibration apparatus as described in claim 3 wherein said shadow wire beam direction sensor comprises a plurality of orthogonal wire pairs which are operatively connected to a housing.

7. An active boresight drift measurement and calibration apparatus as described in claim 5 wherein said predetermined number of interferometers is at least one.

8. An active boresight drift measurement and calibration apparatus as described in claim 6 wherein each wire of said plurality of orthogonal wire pairs is operatively connected to a wire end point reflector.

* * * * *